United States Patent
Liang

(10) Patent No.: US 10,356,044 B2
(45) Date of Patent: Jul. 16, 2019

(54) SECURITY INFORMATION AND EVENT MANAGEMENT

(71) Applicant: Fortinet, Inc., Sunnyvale, CA (US)

(72) Inventor: Dong Liang, Beijing (CN)

(73) Assignee: Fortinet, Inc., Sunnyvale, CA (US)

(*) Notice: Subject to any disclaimer, the term of this patent is extended or adjusted under 35 U.S.C. 154(b) by 14 days.

(21) Appl. No.: 15/852,385

(22) Filed: Dec. 22, 2017

(65) Prior Publication Data

US 2018/0124014 A1    May 3, 2018

Related U.S. Application Data

(63) Continuation of application No. 15/334,592, filed on Oct. 26, 2016, now Pat. No. 9,853,941, which is a continuation of application No. 14/215,233, filed on Mar. 17, 2014, now Pat. No. 9,503,421.

(51) Int. Cl.
*H04L 29/06* (2006.01)
*G06F 9/48* (2006.01)

(52) U.S. Cl.
CPC ........ *H04L 63/0209* (2013.01); *G06F 9/4843* (2013.01); *H04L 63/02* (2013.01); *H04L 63/20* (2013.01)

(58) Field of Classification Search
CPC ..... H04L 63/0209; H04L 63/20; H04L 63/02; G06F 9/4843
See application file for complete search history.

(56) References Cited

U.S. PATENT DOCUMENTS

| | | | |
|---|---|---|---|
| 7,243,148 B2 | 7/2007 | Keir et al. | |
| 8,407,798 B1 | 3/2013 | Lotem et al. | |
| 8,505,022 B2 | 8/2013 | Helander | |
| 8,745,188 B2 | 6/2014 | Westerfeld et al. | |
| 8,800,045 B2 | 8/2014 | Curtis et al. | |
| 9,069,930 B1 * | 6/2015 | Hart | G06F 21/00 |
| 9,306,962 B1 | 4/2016 | Pinto | |
| 9,503,421 B2 * | 11/2016 | Liang | H04L 63/0209 |
| 9,853,941 B2 * | 12/2017 | Liang | H04L 63/0209 |
| 2004/0078384 A1 | 4/2004 | Keir et al. | |
| 2004/0243699 A1 | 12/2004 | Koclanes et al. | |
| 2007/0067452 A1 | 3/2007 | Fung et al. | |
| 2007/0192863 A1 | 8/2007 | Kapoor et al. | |
| 2008/0235801 A1 | 9/2008 | Soderberg et al. | |

(Continued)

OTHER PUBLICATIONS

Kufel, L., "Security Event Monitoring in a Distributed Systems Environment." 2013, IEEE, pp. 36-43.

(Continued)

*Primary Examiner* — Matthew Smithers
(74) *Attorney, Agent, or Firm* — Jaffery Watson Mendonsa & Hamilton LLP

(57) ABSTRACT

Systems and methods are described for conducting work flows by an SIEM device to carry out a complex task automatically. According to one embodiment, an SIEM device may receive a work flow template defining at an abstract level multiple security tasks that are performed by one or more security devices. The SIEM device starts a work flow instance by deriving the work flow instance from the work flow template and scheduling the security tasks to be performed by the one or more security devices or replacements thereof. The SIEM device then collects results of security tasks.

20 Claims, 10 Drawing Sheets

(56) References Cited

U.S. PATENT DOCUMENTS

| | | |
|---|---|---|
| 2011/0302290 A1 | 12/2011 | Westerfeld et al. |
| 2012/0072968 A1 | 3/2012 | Wysopal et al. |
| 2012/0180064 A1 | 7/2012 | Helander |
| 2012/0210434 A1 | 8/2012 | Curtis et al. |
| 2013/0081141 A1 | 3/2013 | Anurag |
| 2014/0047546 A1 | 2/2014 | Sidagni |
| 2014/0096182 A1 | 4/2014 | Smith |
| 2015/0088868 A1 | 3/2015 | Jordan et al. |
| 2015/0264011 A1 | 9/2015 | Liang |
| 2017/0048195 A1 | 2/2017 | Liang |

OTHER PUBLICATIONS

Non-Final Rejection for U.S. Appl. No. 14/215,233 dated Dec. 2, 2015.
Notice of Allowance for U.S. Application No. 14/215,233 dated Aug. 17, 2016.
Non-Final Rejection for U.S. Appl. No. 15/334,592 dated Apr. 5, 2017.
Notice of Allowance for U.S. Appl. No. 15/334,592 dated Sep. 1, 2017.

\* cited by examiner

SECURITY INFORMATION AND EVENT MANAGEMENT

CROSS-REFERENCE TO RELATED APPLICATIONS

This application is a continuation of U.S. patent application Ser. No. 15/334,592, filed Oct. 23, 2016, which is a continuation of U.S. patent application Ser. No. 14/215,233, filed Mar. 17, 2014, now U.S. Pat. No. 9,503,421, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2017, Fortinet, Inc.

BACKGROUND

Field

Embodiments of the present invention generally relate to the field of network security techniques. In particular, various embodiments relate to work flow processing for a security information and event management (SIEM) system.

Description of the Related Art

A large computer network may comprise hundreds of client computers, servers and other network devices that may be located at different places. Multiple security devices, including, but not limited to firewalls, antivirus devices, Intrusion Prevention System (IPS) devices or Unified Threat Management (UTM) devices, can be deployed to regulate network access and protect the network from attacks. The security devices may conduct various tasks to find vulnerabilities of the network, regulate network access and protect the network from attacks. AN SIEM device may be deployed to collect results of the tasks performed by the security devices. The SIEM device may send out an alarm message to the administrator when a high risk event is identified. The SIEM device may also generate a report to show the status of the network, such as the number, targets and sources of attacks that have been captured within a certain period. However, tasks that can be conducted by security devices of the network are independent and results of such tasks cannot be transferred to another task. Furthermore, tasks conducted by different security devices may require different parameters. Even the same task may require different parameters when it is conducted by security devices from different manufacturers. Thus, there is a need for improved SIEM devices that may schedule multiple tasks of various security devices to automatically achieve comprehensive management.

SUMMARY

Systems and methods are described for conducting work flows by an SIEM device to carry out a complex task automatically. According to one embodiment, an SIEM device may receive a work flow template defining at an abstract level multiple security tasks that are performed by one or more security devices. The SIEM device starts a work flow instance by deriving the work flow instance from the work flow template and scheduling the security tasks to be performed by the one or more security devices or replacements thereof. The SIEM device then collects results of security tasks.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
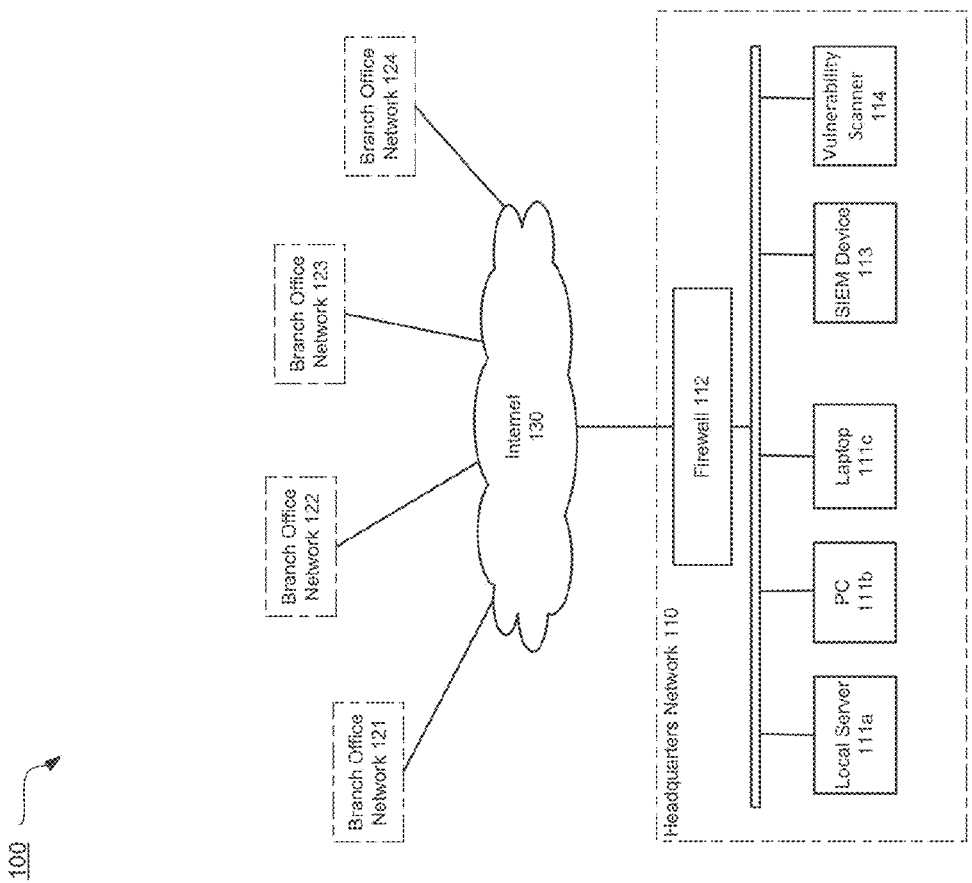
FIG. 1 illustrates an exemplary network architecture in accordance with an embodiment of the present invention.

Systems and methods are described for conducting work flow by an SIEM device to carry out a complex task. For example, an SIEM device may create a work flow or work flow template for conducting a complex function that may be made up of multiple tasks that are executed by multiple security devices. The tasks may be conducted automatically and the results of previous tasks in the work flow may be transferred to subsequent tasks. Further, logical conditions may be defined to determine if a subsequent task in a work flow should be conducted based on the logical conditions.

According to one embodiment, an SIEM device may create a work flow that includes multiple security tasks that are performed by one or more security devices. When a security event is captured or the work flow is scheduled to be executed, the SIEM device starts the work flow by scheduling the security tasks defined in the work flow. The SIEM device then collects results of the security tasks performed by the one or more security devices.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, Virtual Private Networking (VPN), antivirus, IPS, content filtering, data leak prevention, antispam, antispyware, logging, reputation-based protections, event correlation, network access control, vulnerability management, load balancing and traffic shaping—that can be deployed individually as a point solution or in various combinations as a UTM solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, VPN, Internet Protocol (IP) security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture 100 in accordance with an embodiment of the present invention. In the context of the present example, network architecture 100 comprises a headquarters network 110 and multiple branch office networks 121, 122, 123 and 124. Headquarters network 110 and branch office networks 121, 122, 123 and 124 are connected through internetworks, such as the Internet 130. Headquarters network 110 comprises multiple network appliances, such as a local server 111a, a PC 111b, a laptop 111c and other computing devices that are operatively coupled to each other through a Local Area Network (LAN), wherein the LAN is then operatively coupled with a firewall 112 that enables access to Internet 130. Firewall 112 separates the external computing environment, represented by Internet 130, from the internal computing environment of headquarters network 110. Firewall 112 may intercept communications between Internet 130 and network appliances of headquarters network 110 and scan for malware, viruses or other high risk network accesses. The internal structures of branch office networks 121-124 are omitted as they may be the same as that of headquarters network 110.

In the current example, an SIEM device 113 is connected to headquarters network 110. SIEM device 113 may schedule vulnerability scanner 114 of headquarters network 110 and other vulnerability scanners of branch office networks 121-124 to scan computing/networking devices of the networks for vulnerabilities. Vulnerability scanner 114 may be any kind of vulnerability management devices that may be used for identifying and mitigating vulnerabilities that exist in computers or other network appliances. Further, SIEM device 113 may schedule other security devices of networks to conduct other security tasks. These security devices may include, but are not limited to, firewalls, intrusion detection systems (IDSs), Web application firewalls (WAFs), system or Web scanning devices, Distributed Denial of Service (DDoS) mitigation appliances, anti-spam devices, anti-spam devices that protect the networks. The security tasks include scanning for newly added devices and/or new services, configuring and/or conducting network policies for controlling accesses to a network and/or scanning/cleaning virus/spam at computing devices. These security devices may conduct the security tasks at one or more network layers and record the results of the tasks in their logs. The logs may be sent to SIEM device 113 in real time or periodically by these security devices.

Although in the present example, SIEM device 113 is located at headquarters network 110, those of ordinary skill in the art will appreciate that SIEM device 113 may located within any of the networks 110 or 121-124. It will also be appreciated by one skilled in the art that SIEM device 113 may be a cloud-based SIEM device that schedules security tasks and collects logs from the security devices of all internal networks. SIEM device 113 analyzes the logs from different security devices and sends out an alarm to the administrator of SIEM device 113 when abnormal activity is detected. SIEM device 113 may also provide a report to the administrator regarding the status of the whole network, such as total number of attacks detected within a particular time period and the distribution of sources and targets of the attacks.

SIEM devices are useful to the administrator of a large network, which may include hundreds of computing devices distributed among different locations. However, existing SIEM devices schedule security tasks independently because the security tasks conducted by security devices from different manufactures require different parameters when scheduled and the results of the security tasks are also in different formats. Although some tasks may be logically connected and may be sequentially conducted to carry out a complex task, the administrator of existing SIEM devices has to schedule these tasks manually. For example, when the administrator wants to add a new website to the network, a host discovery task is scheduled to discover a newly added host. Then, the administrator checks the result of the host discovery. If a new host is found, a test Hypertext Transfer Protocol (HTTP) service task is scheduled to verify if an HTTP service is provided by the new host. If an HTTP service is found on the new host, an HTTP service scan task is conducted to verify if any leakage exists in the HTTP service. When the HTTP service is verified, then the new HTTP service may be added to the network. The above mentioned host discovery task, test HTTP service task and HTTP service scan task are scheduled manually by the administrator because the task may be conducted by security devices from different manufacturers and results of the security tasks cannot be transferred to other tasks.

In order to address the above mentioned problems, work flows and work flow templates are introduced to SIEM device 113 in various embodiments of the present invention. The structure and functions of SIEM device 113, according to one embodiment of the present invention, is described below with reference to FIG. 2.

Figure 2:
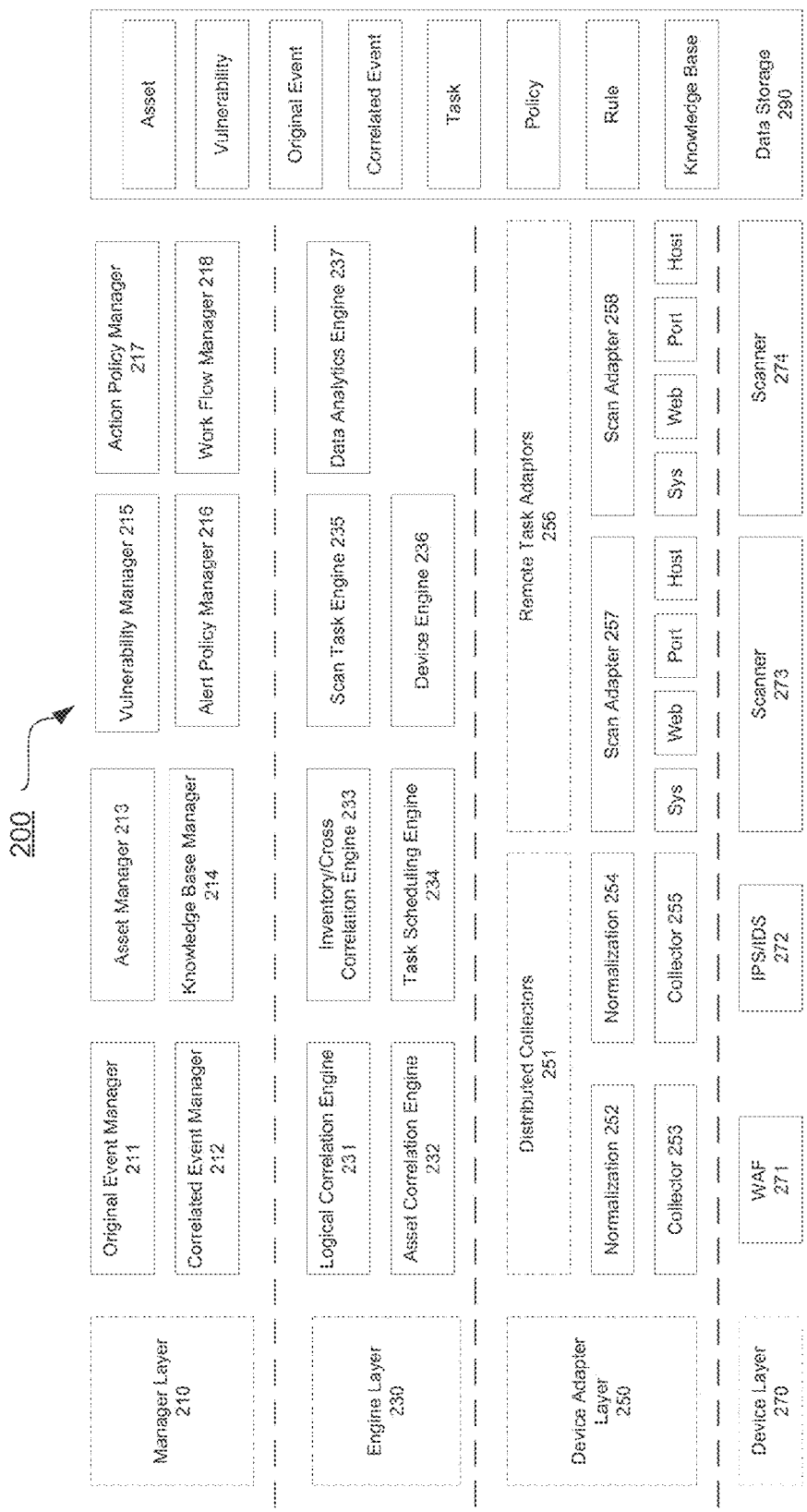
FIG. 2 illustrates exemplary functional units of an SIEM device in accordance with an embodiment of the present invention.

FIG. 2 illustrates exemplary functional units of an SIEM device 200 in accordance with an embodiment of the present invention. In the present example, SIEM device 200 comprises a manager layer 210, an engine layer 230, a device adapter layer 250 and a device layer 270. Each of these layers represents a group of modules that conduct corresponding functions at different levels. SIEM device 200 further comprises a data storage 290. Data storage 290 comprises multiple data tables, such as asset tables, vulnerability tables, original event tables, correlation event tables, task tables, policy tables, rule tables, knowledge base and etc. Each module of SIEM device 200 may access corresponding tables of data storage 290 for managing corresponding data.

Manager layer 210 represents interface modules that are used for managing the configuration and scheduling of other engines, adapters or devices of SIEM device 200 to conduct work flows. At manager layer 210, SIEM device 200 includes an original event manager 211, a correlated event manager 212, an asset manager 213, a knowledge base manager 214, a vulnerability manager 215, an alert policy manager 216, an action policy manager 217 and a work flow manager 218.

Original event manager 211 is used for managing original events as well as work flow results collected from security devices that are managed by SIEM device 200. Security devices, such as WAF 271, IPS/IDS 272 and scanners 273 and 274, may collect original events while inspecting network activities. These security devices may also conduct tasks scheduled by task engine 235 based on a work flow. The original events may be monitored by data analytics engine 237 for any abnormal network activities. The original events and results of tasks may be logged and fed back to logical correlation engine 231, inventory/cross correlation engine 233 or data analytics engine 237 for further analyzing. Original event manager 211 may configure rules that devices at device adapter layer 250 may use for controlling particular events and/or data that should be collected and how the collected data or events are to be fed back.

Correlated event manager 212 is used for defining the correlations of the original events collected by devices at device adapter layer 250. In some cases, the same event may be captured and logged by multiple security devices and SIEM device 200 may receive multiple original events for the same events. In some other cases, different events are captured by different security devices and these events may be associated with the same attack. These events relating to the same attack may be connected to form a complete attack procedure. Correlated event manager 212 is used for defining the rules for conducting multiple correlation processing, such as logical correlation, asset correlation, inventory correlation, cross correlation and knowledge correlation.

Asset manager 213 is used for managing asset attributes of networks managed by SIEM device 200. Asset manager 213 may create and update one or more asset tables in data storage 290 to register all or core assets of the network(s). Each of the assets or core assets may be assigned an asset value. A risk level of an event may be set and adjusted based on an asset value and/or other attributes of the target of the event in the network. If the target of the event is a core asset of the network, the calculated risk level of the event may result in a higher value relative to a calculated risk level of a non-core asset. For example, a web server providing the most important web application for a company would be considered a core asset of the whole network and would typically be assigned a high asset value. When an attack is targeting this web server, the determined risk level of this attack is high and therefore an alarm is more likely to be generated by SIEM device 200. On the other hand, a client PC within the network would typically be considered a non-core asset of the network or may not even be present in the asset list of the network. When an attack is targeting this client PC, the determined risk level is low and therefore no alarm is sent to the administrator.

Knowledge base manager 214 is used for managing a knowledge base of data storage 290. Knowledge base manager 214 may collect and store information, including, but not limited to, services, protocol, ports, firmware, operation systems, patches, plug-ins and the like, that relate to system vulnerabilities, viruses and/or network attacks. When an attack is caught by a security device, SIEM device 200 may search knowledge base to find corresponding vulnerabilities related to the attack at issue. If a vulnerability relating to the attack is found in knowledge base, a correlation engine may invoke inspection or scanning tools to scan a target host for the corresponding vulnerability.

Vulnerability manager 215 is used for recording vulnerabilities that are exploited by attacks in a vulnerability ID DB. Attributes of attacks, including, but not limited to, information contained within the Common Vulnerabilities and Exposures (CVE) system, BugTraq or S3CVE, may be stored in vulnerability ID DB. When a security event is received by a cross correlation engine, the corresponding vulnerability of the security event is searched for within vulnerability ID DB. If cross correlation engine identifies a correlation between the attack and vulnerability based on standard attributes, it may invoke inspection or scanning tools to scan the target host for the corresponding vulnerability.

Alert policy manager 216 is used for managing the policies that regulate alarm actions when security events are received. Usually, the private/internal networks managed by SIEM device 200 may deploy multiple security devices at different locations. These security devices may scan the networking devices of the private/internal networks and manage the access to the network devices from/to a public/external network, such as the Internet. These security devices may report network activities or security events they captured periodically or in real time. Therefore, SIEM device 200 may receive numerous security events from the security devices. To avoid too many alarm messages, an administrator of SIEM device 200 may set alert policies so that only security events that have high risk levels (such as those representing an attack of a core asset of the network) may trigger an alarm message. Alert policies may further configure persons, time periods, types of warnings that alarm messages may send based on risk levels of security events. The types of warnings may be a syslog sent to a remote terminal or an electronic mail (Email) or Short Message Service (SMS) message.

Action policy manager 217 is used for managing actions that SIEM device 200 carries out when particular security events are received. Action policy may include correlated event action policy, web attack action policy, system attack action policy, virus event action policy and audit event action policy. These policies may define tasks or work flows that should be carried out when corresponding events are received by SIEM device 200.

Work flow manager 218 is used for configuring work flows that can be executed by SIEM device 200 to carry out complex tasks. A work flow defines a work flow task that contains a group of tasks that may be sequentially or concurrently conducted by one or more security devices so that a complex function may be accomplished automatically by SIEM device 200. The results of a previous task in the work flow may be used to trigger the next task and the results may be transferred as parameters to the next task. Work flow manager 218 may create a work flow by specifying a series of commands/instructions that are carried out by multiple security devices. Each one in the series of commands/instructions designates a specific task, a host that conducts the specific task and optional parameters needed to conduct the task. The parameters may be the results of previous tasks in the work flow. The parameters may also include logic conditions for triggering the task. By defining a work flow, SIEM device 200 may link multiple security tasks together to accomplish a complex task automatically even though these tasks may be conducted by different security devices potentially from different manufacturers. Each of the work flows created by work flow manager 218 may be saved in a configuration file. A graphic representation may also be used to show the procedure of a work flow so that a user may understand the work flow task more easily. Work flow manager 218 may further configure one or more work flow policies to define the periods that one or more work flows or work flow templates should be executed. The work flow policies may also define one or more security events that may trigger the execution of one or more work flows or work flow templates. A work flow or work flow template may be started by task scheduling engine 234 at a designated time or triggered by a security event based on the corresponding work flow policy.

In some embodiments, a specific work flow is used for particular security devices to carry out a designated work flow task. The commands and/or parameters for scheduling tasks in the work flow are dedicated to the hosts conducting the task. SIEM device 200 uses specific work flows for each security device that are relatively simple to implement. However, specific work flows are not flexible in some scenarios. For example, when different security devices are conducting the same work flow task, multiple or duplicated work flows are created for the different security devices. Further, when a new host is added to the network, new work flows are created for the new host to carry out work flow tasks. Similarly, when an existing host is upgraded/changed, the commands or parameters needed for conducting a task may be changed. All the work flows relating to the changed host should be changed in order to correctly carry out the tasks.

In order to adapt to different network environments, in some embodiments, work flow manager 218 may also be used for configuring work flow templates that can be conducted by SIEM device 200. A work flow template defines a general work flow task that contains a group of abstract tasks describing functions needed to be conducted by multiple security devices so that a complex function may be accomplished automatically. A work flow template does not designate the specific tasks or specific hosts that should be scheduled to conduct tasks when the work flow template is created. A work flow template may use descriptors to define abstract tasks to be executed in the work flow. Descriptors may define the name, parameters and logical conditions of an abstract task without designating specific tasks or specific hosts for executing the tasks. At the time a work flow template is scheduled to be executed, a device engine may be used for translating the descriptors of an abstract task into specific commands, parameters and logical conditions that are used by the specific hosts for conducting the abstract tasks. In this manner, a work flow instance may be derived from the work flow template by the device engine. A work flow instance may also be conducted by the hosts in the same manner as a specific work flow created directly for the host.

Since a work flow instance is derived from a work flow template by a device engine when or before the work flow template is scheduled to start, it does not need to create the same work flow multiple times for security devices that are desired to conduct the same work flow task. When a security device is added to carry out an existing work flow, it does not need to add a new work flow for the new security device. Rather, a set of commands and parameters for the newly added device may be added to the device engine and a work flow instance for the newly added security device may be derived from the work flow template when needed. Similarly, when an existing security device is upgraded/changed, device engine 236 registers the changed commands and parameters for the existing security device and it does not need to change any work flow template.

Engine layer 230 represents multiple engines of SIEM device 200, wherein each engine drives the execution of work flows or analysis of the results of work flows. In the present example, at engine layer 230, SIEM device 200 comprise a logical correlation engine 231, an asset correlation engine 232, an inventory/cross correlation engine 233, a task scheduling engine 234, a task engine 235, a device engine 236 and a data analytics engine 237.

Logical correlation engine 231 is used for conducting logical correlation to the original events so that related or repeated events may be combined into one security event. Original events may be captured by different security devices at different locations, different network segments and different network layers. In some cases, the same event may be captured and logged by multiple security devices and SIEM device 200 may receive multiple original events for the same event. In some other cases, different events are captured by different security devices and these events may be associated with the same attack. These events relating to the same attack may be connected to form a complete attack procedure. After logical correlation, one security event may be extracted from the repeated or related original events and others events may be discarded. Alternatively, instead of extracting one event from repeated or related events, a new security event may be generated to represent the repeated or related original events.

Asset correlation engine 232 is used for conducting asset correlation among the security events and the assets of a network so that only security events relating to core network assets will generate notifications to the administrator of the network or trigger a work flow. To conduct the asset correlation, asset table may be setup to register all or a subset of assets (e.g., core assets) of the network. In one embodiment, each asset is provided with an asset value representing the importance of the asset to the network. When a core asset that has a high asset value is under attack, a high risk level is associated with the security event and an alarm is more likely to be generated to warn the administrator or trigger a work flow to conduct a virus/vulnerability scan of the network.

Inventory/cross correlation engine 233 may further adjust the risk level of the security event based on whether a vulnerability that an attack is targeting exists in the target host. SIEM device 200 may maintain an inventory table that registers the attributes of assets of the network. When an attack needs a particular network environment while the target of the attack is running in that network environment, it means that the attack may affect the target and Inventory/cross correlation engine 233 may adjust the risk level of the attack. Inventory/cross correlation engine 233 may further adjust the risk level of an attack based on whether a vulnerability that an attack is targeting exists in the target host based on the vulnerability ID DB or knowledge base. Logical correlation engine 231, asset correlation engine 232 and inventory/cross correlation engine 233 are described in a copending application that is assigned to the same assignee as the present application. The related copending application is U.S. patent application Ser. No. 14/052,713, filed on Oct. 12, 2013 and is hereby incorporated by reference in its entirety for all purposes.

Task scheduling engine 234 is used for launching work flows at the times designated by the work flow policies. When a work flow is to be launched/triggered, tasks in work flows or work flow templates are extracted by task scheduling engine 234. Then, the extracted tasks are sent to task engine 235 for execution. In some embodiments, after a task in a work flow is executed by task engine 235, the results of the task are fed back to task scheduling engine 234. Then, task scheduling engine 234 may determine if the results of the task may trigger a next task based on one or more logical conditions defined in the work flow. Upon a determination that the next task should be triggered, the next task is sent to task engine 235 for execution.

Task engine 235 is used for driving the execution of tasks and collecting results of tasks after tasks are executed. When a task of a work flow is received from task scheduling engine 234, task engine 235 connects to the host designated in the task through a corresponding adapter and ports. The task is then executed by the specific host and the results of the task are fed back to the task engine 235 through the adapter and ports. When an abstract task from a work flow template is received from task scheduling engine 234, task engine 235 sends the abstract task to device engine 236 for translation. After a specific task translated by device engine 236 is received by task engine 235, the specific task is executed as described above.

In some embodiments, device engine 236 is used for translating an abstract task into a specific task that can be executed by task engine 235. Device engine 236 may comprise a function table that registers functions or tasks that security devices of SIEM device 200 can execute. The function table may comprise descriptors of tasks and corresponding specific commands/instructions, parameters for executing the tasks of security devices. When an abstract task is received, device engine 236 extracts the descriptors from the abstract task and searches the function table for the descriptors. Then, the descriptors of the abstract task are replaced with specific commands/instructions and parameters of a specific security device so that a specific task is created for execution by the specific security device. The created specific task is fed back to task engine 235 by device engine 236. In other embodiments, device engine 236 may derive a work flow instance from a work flow template by translating the abstract tasks in the work flow template into specific tasks that may be executed by specific hosts.

Data analytics engine 237 is used for analyzing results of a work flow so that a report or an alarm message may be sent out to the administrator based on alert policies. Data analytics engine 237 may further invoke logical correlation engine 231, asset correlation engine 232 and Inventory/cross correlation engine 233 to conduct correlation analyzing to the results of a work flow so that results of the work flow that relate to core network assets may be found and reported to the administrator.

Device adapter layer 250 represents interfacing modules that connect SIEM device 200 and security devices of the network managed by SIEM device 200 for collecting security events from the security devices. The security devices of a large network may be from different manufacturers and may be deployed at various locations. The security devices may have different commands/instructions for remotely calling the tasks. Security event reports and the results of tasks from different security devices may have different formats. Therefore, the adapters allow SIEM device 200 to schedule different security devices to conduct designated tasks and receive security events and results of tasks in uniform formats. In one embodiment, at device adapter layer 250, SIEM device 200 includes distributed collectors 251 and remote task adapters 256. Distributed collectors 251 represent multiple security event collectors, such as collectors 253 and 255. Collectors 253 and 255 are used for collecting original security events from security devices. These original security events from different security devices may contain different contents in different formats. The original security events may be sent to normalization 252 and 254 for normalizing. After normalization, the information that is useful for correlation in the original security events may be retained and saved in a unified format. It will be easier for correlation engines to correlate events from different sources after the original events are normalized.

Remote task adapters 256 represent interfacing modules that connecting SIEM device 200 and security devices of the network managed by SIEM device 200 for executing tasks by the security devices and receiving feedback/results of the tasks from the security devices. In some embodiments, SIEM device 200 may include multiple scan adapters, such as scan adapter 257 and 258. In the present example, scan adapters 257 and 258 further comprises four interfaces for carrying out different scanning tasks, such as a system scan, a web scan, a port scan and a host scan. Those of ordinary skill in the art will appreciate that various other kinds of adapters may be used for connecting other security devices and for executing other tasks.

Device layer 270 represents security devices that are integrated with or connected to SIEM device 200. The security devices may conduct various tasks that may be scheduled locally or remotely by SIEM device 200 based on a work flow or a work flow template. In the present example, device adapter layer 250 includes a WAF 271, an IPS/IDS 272, a vulnerability scanner 273 and a vulnerability scanner 274. These security devices may be from different manufacturers and may have different commands/instructions to be scheduled for executing tasks. These security devices may also report security events, task results/scan results back to SIEM device 200. Those of ordinary skill in the art will appreciate that security devices other than those described with reference to device adapter layer 250 may be integrated with or connected to SIEM device 200. Because the functions and operations of these security devices are well known in the art, detailed descriptions thereof will be omitted.

Figure 3:
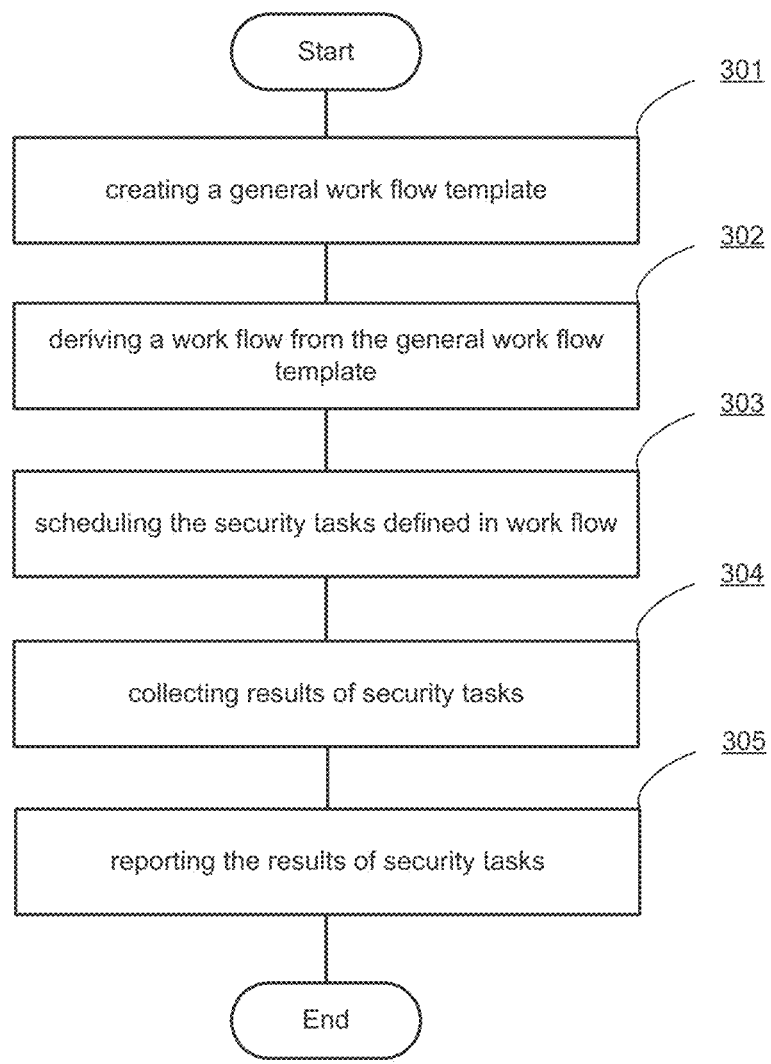
FIG. 3 is a flow diagram for conducting a work flow in accordance with an embodiment of the present invention.

FIG. 3 is a flow diagram illustrating the general steps of a method for conducting a work flow by an SIEM device in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 301, a work flow template is created by the administrator of an SIEM device. The work flow template defines abstract tasks that may be conducted by multiple security devices. The abstract tasks describe the names or functions of tasks that may be conducted by multiple security devices without specific commands/instructions or parameters that are needed for conducting the tasks. Descriptors may be used for describing the task name, parameters and logical conditions for scheduling the tasks. By using work flow templates and dynamically creating a work flow instance when scheduled, an SIEM device has more flexibility to use various security devices from different manufacturers. The management of work flows of the SIEM device is also simplified because the work flow templates remain unchanged when security devices are changed or added to the network managed by the SIEM device.

At block 302, at the time a work flow template is scheduled for execution, a work flow instance or specific tasks are derived from the work flow template by translating the abstract tasks in the work flow template into specific tasks that can be executed by specific security devices. A device engine of the SIEM device may maintain a task table that registers tasks that can be called by the SIEM device. The specific commands/instructions, parameters, logical conditions and corresponding descriptors thereof are registered in the task table. When a work flow template is scheduled to be executed by a task scheduling engine of the SIEM device, a work flow instance or specific tasks may be derived by the device engine before it is executed.

At block 303, the work flow is scheduled by the task scheduling engine. Each task defined in the work flow is read out by the task scheduling engine. The task and parameters needed for execution are sent to the corresponding security device for execution. The tasks may be sequentially or concurrently executed by multiple security devices despite the security devices being from different manufacturers and/or having different parameters or formats for conducting the tasks.

At block 304, execution results of tasks are collected by the task scheduling engine. In some embodiments, the execution results of a task in the work flow may be used for determining if a following task should be triggered. In some other embodiments, the final results of a work flow may also be reported to the administrator. Therefore, the results of execution of each task of the work flow may be collected by the task scheduling engine through the adapters and ports with the security devices.

At block 305, the task scheduling engine may also report the execution results of the work flow to an administrator of the SIEM device. In one embodiment, the execution results of a work flow may include indications regarding whether each of the tasks in the work flow have been executed successfully. In other embodiments, the execution results of a work flow may include all the logs of each of the tasks in the work flow. The execution results of the work flow may be sent to correlation engines of the SIEM device. The correlation engines may filter the results of the work flow and identify those of the security events that relate to core assets of the network. When the risk levels of the security events are high, alarm messages, such as Emails, SMSs or syslogs, may be sent to the administrator based on the alert policies.

Figure 4:
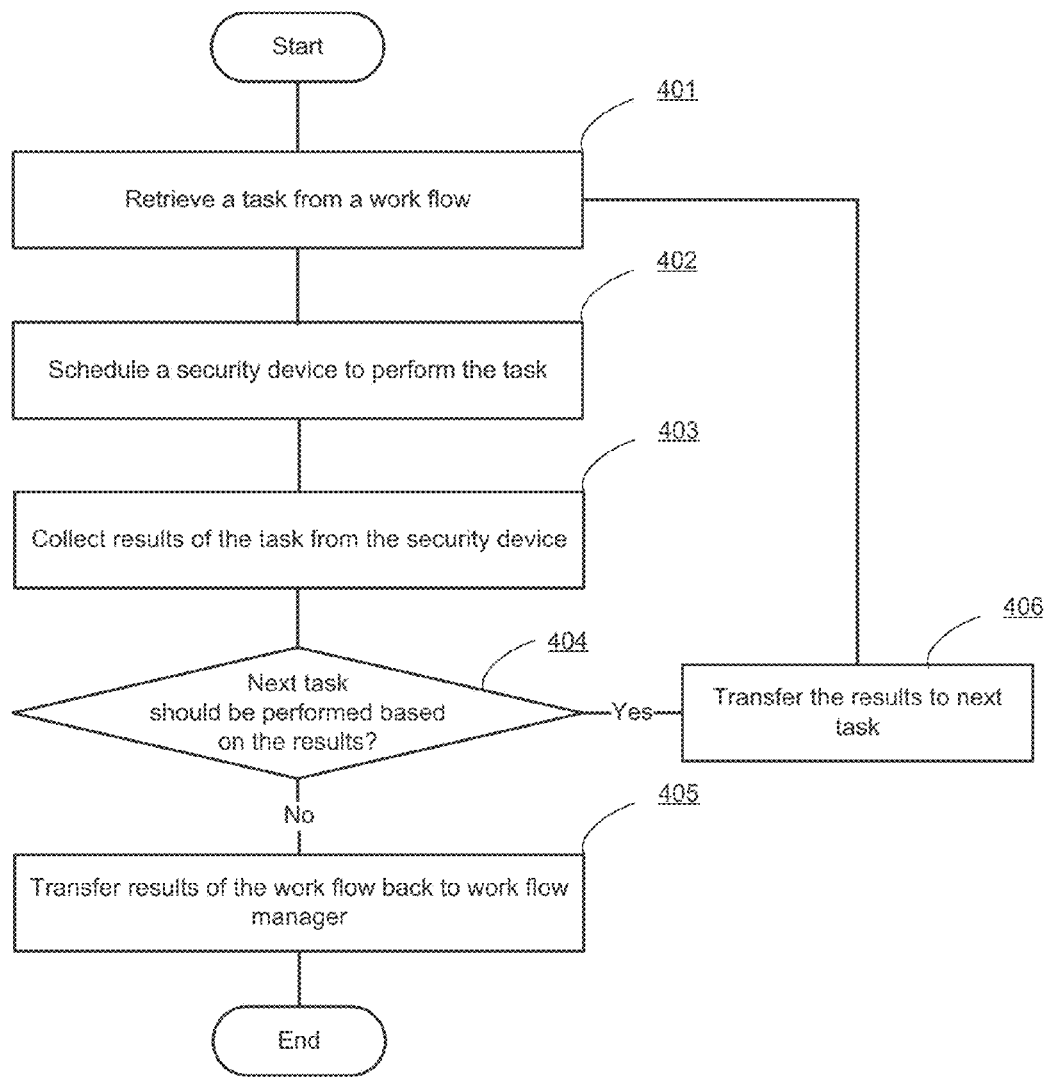
FIG. 4 is a flow diagram for scheduling tasks based on a special work flow in accordance with an embodiment of the present invention.

FIG. 4 is a flow diagram illustrating the execution of a work flow in accordance with an embodiment of the present invention. A work flow of an SIEM device defines tasks that are conducted by multiple security devices to achieve comprehensive management of a network. A work flow may be a set of commands/instructions that can be carried out by security devices together with parameters or logical conditions for the execution of commands/instructions. A work flow may be created directly by an administrator of the SIEM device. FIG. 4 illustrates the execution of a work flow after it is created.

At block 401, when a work flow is started by a task scheduling engine, a task in the work flow is read out. The task scheduling engine sends the task to task engine for execution.

At block 402, the task engine receives the task and schedules a security device to execute the task. As the task includes information indicative of the designated host (such as a host name or an Internet Protocol (IP) address) and commands and parameters for executing the task by the host, the task engine may connect to the host through an adapter between the SIEM device and the host and send the commands to the host for execution.

At block 403, the task engine collects results of execution of the task through the connection between the SIEM device and the host. The results of execution of the task may be an indication of whether the task successfully executed and/or a log of execution of the task.

At block 404, the task scheduling engine may check the results of the task and determine if the next task should be triggered based on logical conditions defined in the work flow. If the task scheduling engine determines that the next task should be executed, the execution results of the task may be transferred to the next task at block 406 and the process goes back to block 401 for execution of the next task in the work flow.

If the task scheduling engine determines that a further task need not be executed, e.g., all the tasks in the work flow are finished, results of the work flow is reported to the administrator of the network at block 405. The results of work flow may indicate whether each of the tasks in the work flow have been executed successfully. The results of work flow may also include all the logs of executions of each task in the work flow.

Figure 5:
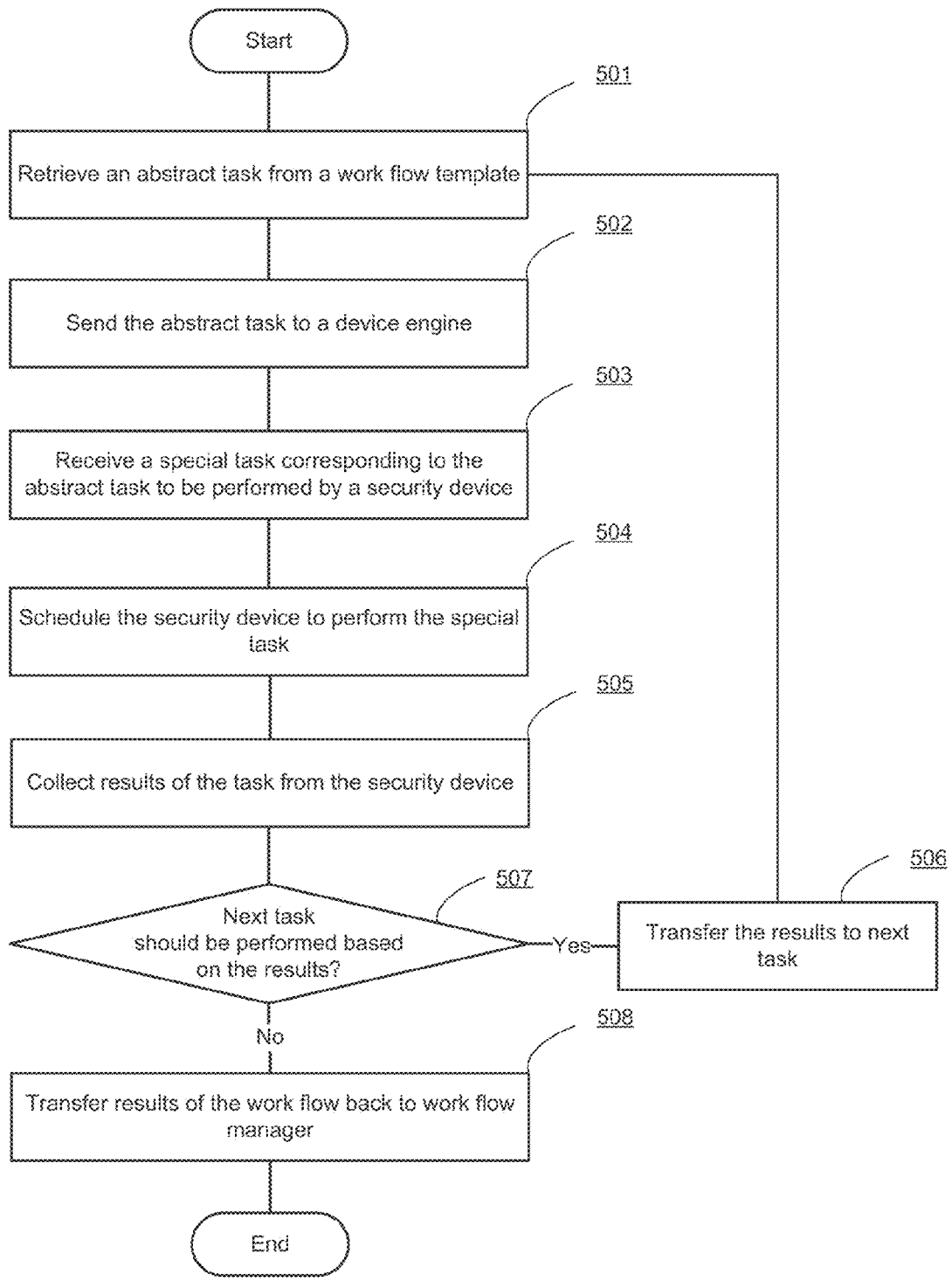
FIG. 5 is a flow diagram for scheduling tasks based on a work flow template in accordance with an embodiment of the present invention.

FIG. 5 is a flow diagram illustrating scheduling tasks based on a work flow template in accordance with an embodiment of the present invention. In the present example, a work flow template is scheduled by task scheduling engine instead of a specific work flow as shown in FIG. 4 and tasks in the work flow template are derived when the work flow template is scheduled.

At block 501, when a work flow template is scheduled based on a work flow policy or is triggered by a security event based on an action policy, task scheduling engine retrieve an abstract task from the work flow template. The abstract task may comprise descriptors of the task that a security device is to execute.

At block 502, the task scheduling engine sends the abstract task extracted from the work flow template to a device engine. The device engine may extract the descriptors from the abstract task and search a task table for actual parameters, such as commands/instructions, that correspond to the descriptors of the abstract task. The device engine then replaces the descriptors of abstract tasks with the corresponding actual parameters of specific hosts and creates actual tasks that can be executed by the hosts. The actual task derived from the abstract task is then transferred back to the task scheduling engine for execution.

At block 503, the task scheduling engine receives the actual task derived from the abstract task. The actual task contains the host, commands/instructions and necessary parameters for executing the task.

Blocks 504 through 508 generally correspond to blocks 402 through 406 of FIG. 4 and hence further description thereof is omitted for brevity.

Figure 6:
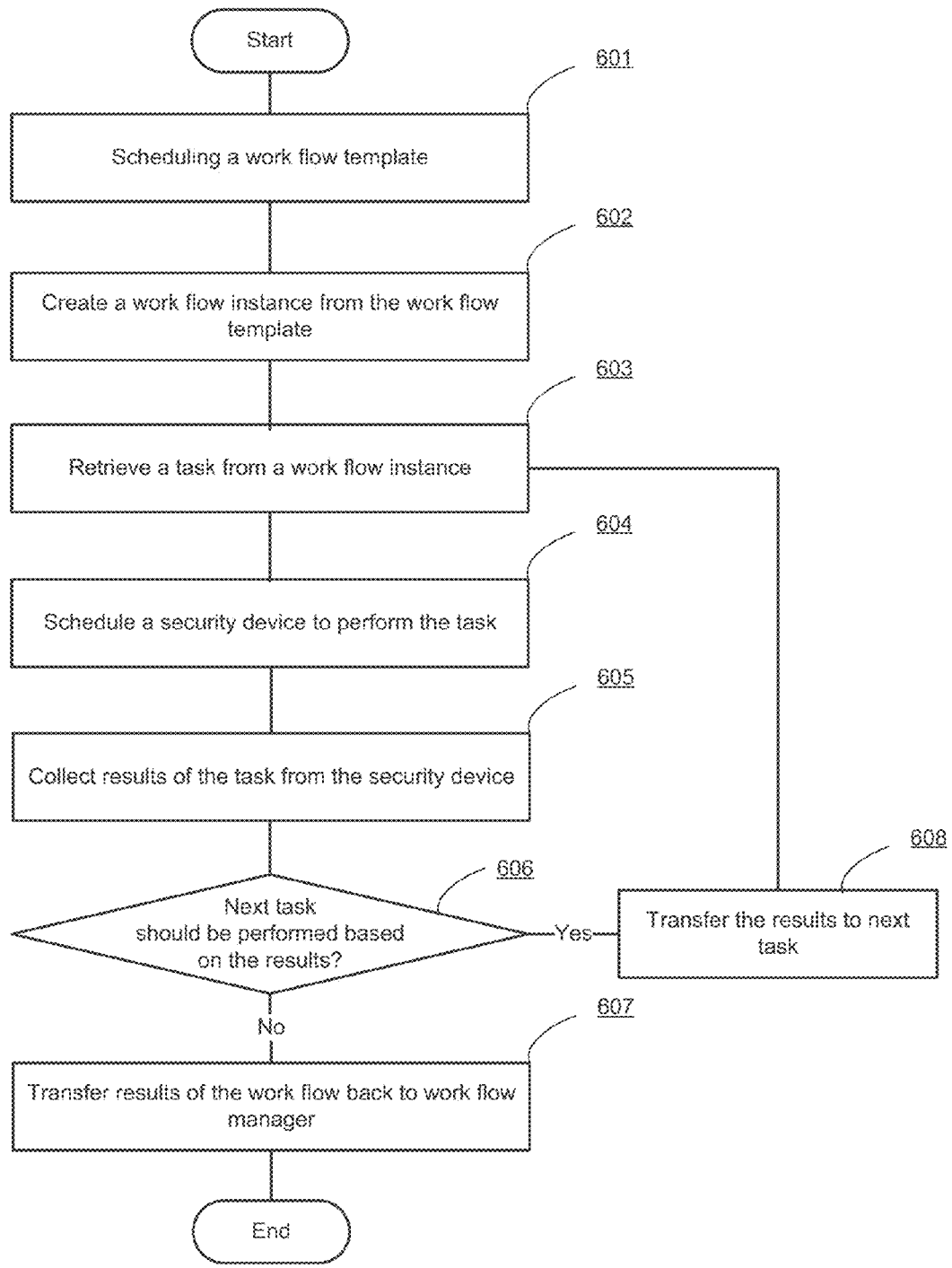
FIG. 6 is a flow diagram for scheduling tasks based on a work flow template in accordance with another embodiment of the present invention.

FIG. 6 is a flow diagram illustrating scheduling tasks based on a work flow template in accordance with another embodiment of the present invention. In the present example, a work flow template is scheduled by task scheduling engine instead of a specific work flow as shown in FIG. 4 and a work flow instance is derived from the work flow template when the work flow template is scheduled.

At block 601, a work flow template is scheduled based on a work flow policy or is triggered by a security event based on an action policy.

At block 602, the task scheduling engine sends the work flow template to a device engine. The work flow template may contain multiple abstract tasks. The device engine may retrieve each abstract task from the work flow template and extract the descriptors from the abstract task. The device engine searches a task table for actual parameters that corresponding to the descriptors of the abstract tasks. The device engine then replaces the descriptors of the abstract tasks with the corresponding actual parameters of a specific host and creates a work flow instance that can be executed by the host. The work flow instance derived from the work flow template is transferred back to the task scheduling engine for execution.

Blocks 603 through 608 generally correspond to blocks 401 through 406 of FIG. 4 and hence further description thereof is omitted for brevity.

Figure 7:
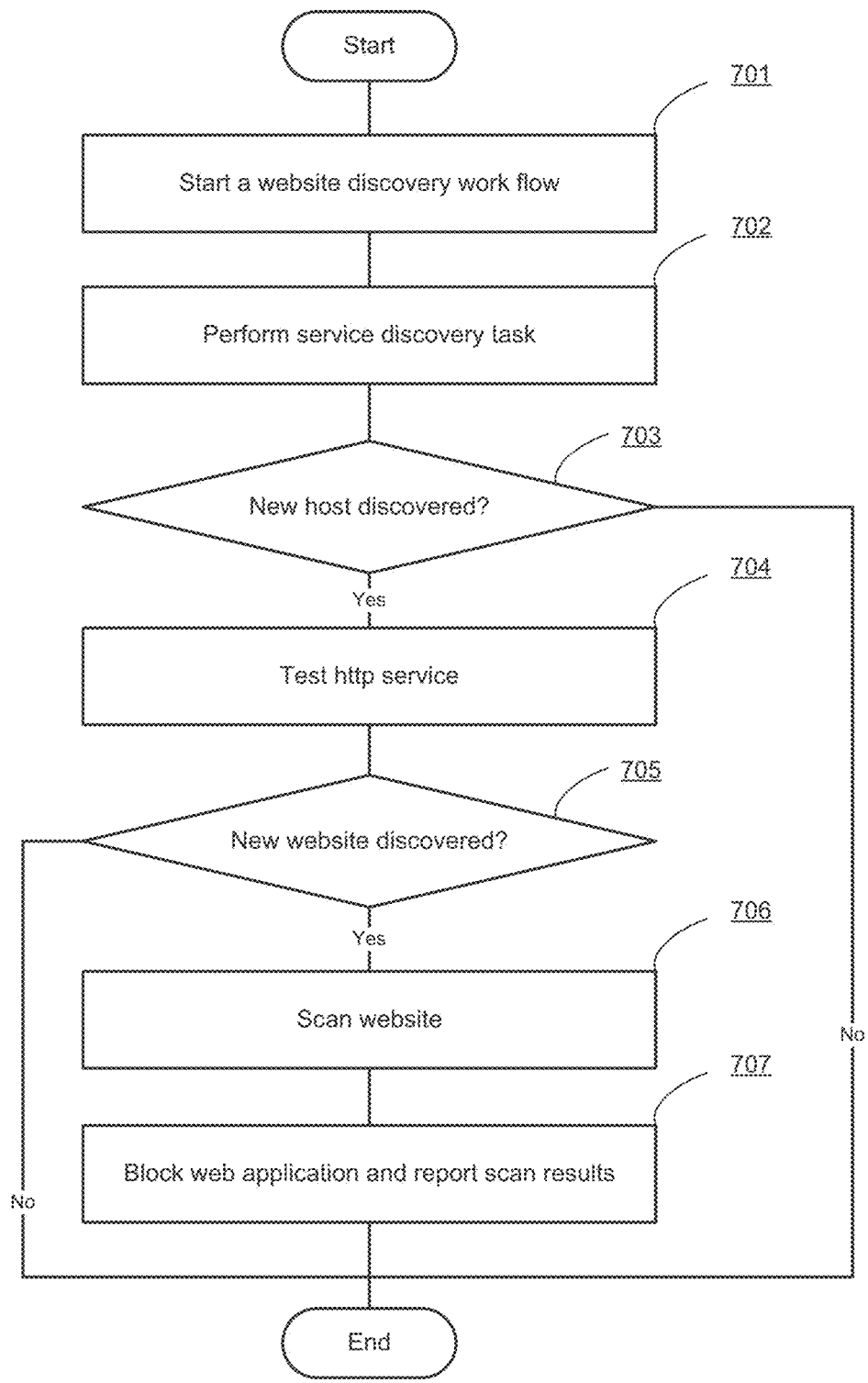
FIG. 7 is a flow diagram illustrating a website discovery work flow in accordance with an embodiment of the present invention.
Figure 8:
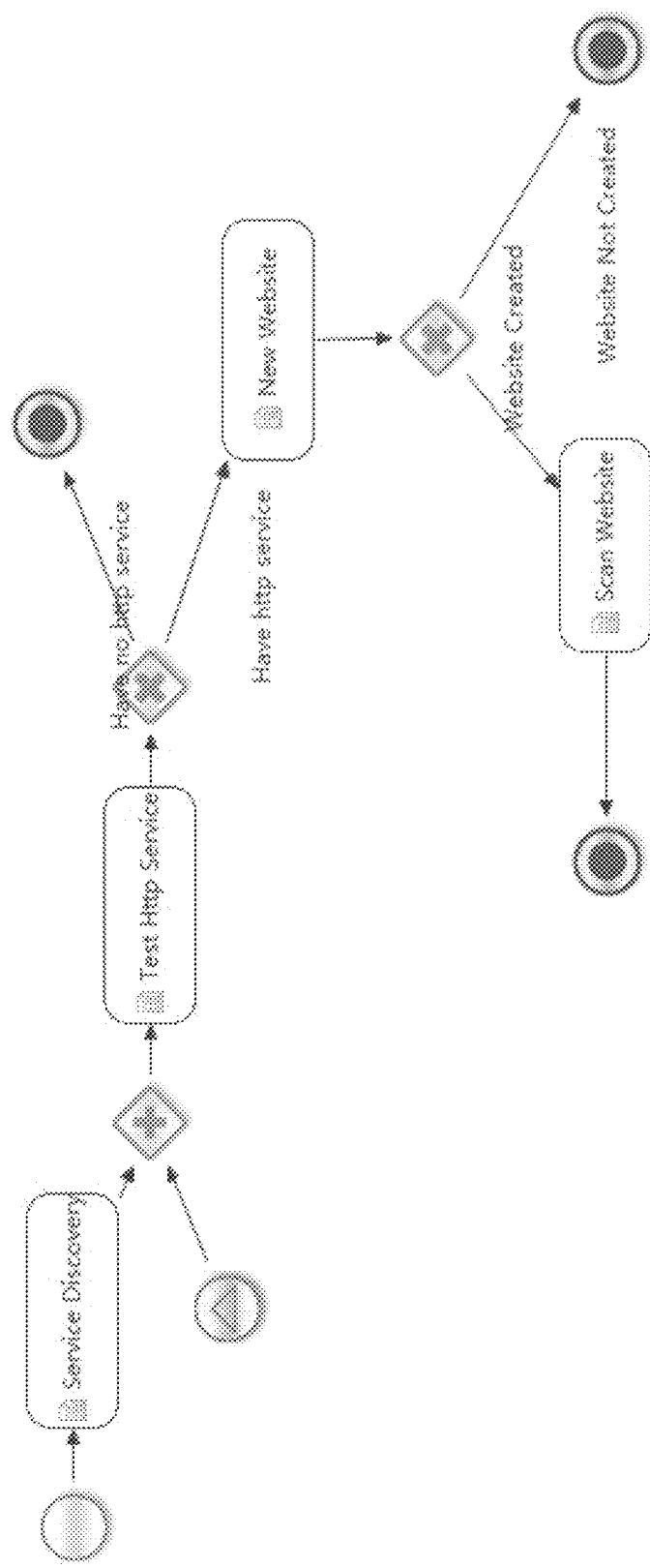
FIG. 8 is a graphic representation of a website discovery work flow in accordance with an embodiment of the present invention.

FIG. 7 is a flow diagram illustrating a website discovery work flow in accordance with an embodiment of the present invention. In the present example, a website discovery work flow comprises three tasks, i.e., a service discovery task, an HTTP service test task and a website scan task, each of which may be carried out by different scanners. The website discovery work flow may be used for discovering a website that is newly added to the network and verifying if any vulnerability exists in the website before the website is allowed to provide service. An exemplary graphic representation of the website discovery work flow of the present example is shown in FIG. 8.

At block 701, a website discovery work flow is started by a task scheduling engine of an SIEM device.

At block 702, a first task, i.e., a service discovery task, is retrieved from the website discovery work flow. The service discovery task contains an IP address or a network segment that is to be scanned. The SIEM device then schedules a service scanner to scan the designated IP address or network segment in order to find any new websites.

At block 703, the SIEM device may check the log of the service scanner to determine if any host discovered by the service scanner is not registered in the network asset table. If a host is discovered and was not previously registered in the network asset table, the procedure goes to block 704. If no new host is discovered by the service scanner, the work flow is finished.

At block 704, a second task, i.e., an HTTP service test task, is retrieved from the work flow and an HTTP service scanner is scheduled by the SIEM device to detect the IP address of newly added host for HTTP service. The ports that are used for providing the HTTP service of the new host are tested by the HTTP service scanner to determine if the newly added host is providing HTTP service. The HTTP service scanner may also test if a website is already created at the host.

At block 705, the result of HTTP service scan task is examined. If the new host does not provide HTTP service or no website is created, the work flow is finished. If the new host is providing HTTP service and a new website is already created, the procedure goes to next step and further scanning will be carried out.

At block 706, a third task, i.e., a website scanning task, is retrieved from the work flow. The SIEM device schedule a website scanner to detect the newly added website to find out any vulnerability exists in the website.

At block 707, the SIEM device allows or blocks the new website based on the results of website scan. The result of website discovery work flow may also be reported to the administrator of the SIEM device.

In the above example, the website discovery work flow is scheduled manually or periodically. In other embodiments, the website discovery work flow may be triggered by a network audit event. After a network hardware auditing, a new host is found and then the website discovery work flow may be started to scan the new host for HTTP service and vulnerabilities. By using a website discovery work flow, the management of new websites in a network is simplified and may be conducted automatically.

In some embodiments, a web scanning task and a website block task may be combined to form a web scanning work flow. The web scanning work flow may be conducted manually or periodically. Further, in one embodiment of the present invention, a work flow may include another work flow to form a complex work flow. For example, a website discovery work flow may include a service discovery task, an HTTP service test task and a website scan work flow.

Figure 9:
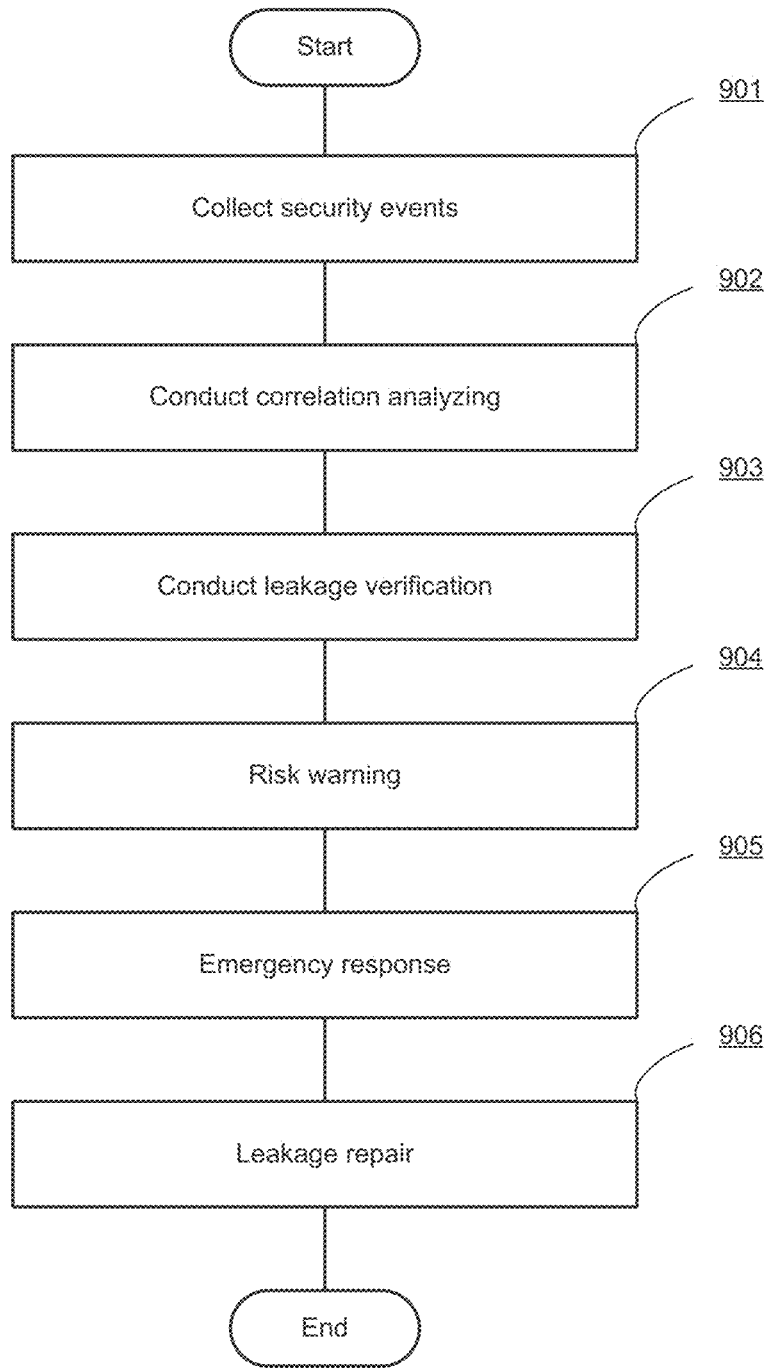
FIG. 9 is a flow diagram illustrating a closed-loop work flow for a security event in accordance with an embodiment of the present invention.

FIG. 9 is a flow diagram illustrating a closed-loop work flow for a security event in accordance with an embodiment of the present invention. A closed-loop work flow is a work-flow-based integrated procedure that may be carried out by an SIEM device when attacks are captured. By defining various closed-loop work flows for various attacks, the processing of every attack becomes an integrated procedure starting from event capturing to leakage repair so that each processing of attacks can be carried out timely and accurately.

In the following description, an example of closed-loop work flow is described based on a scenario in which a security event received by the SIEM device is a SQL injection attack. Those skilled in the art will appreciate that other security events may also be processed by the same type of closed-loop work flow.

At block 901, a closed-loop work flow begins with a task of collecting one or more security events by the SIEM device from different security devices that are distributed at different locations. The security events may be security logs that may be sent to the SIEM device in real time or periodically. The security logs may contain the most important information regarding the events, including, but not limited to, the source IP addresses, the destination IP addresses, protocols, ports, applications, times of the events and the like. The security logs are then filtered and normalized so that relevant information that is useful for further analysis may be kept and all the information may be stored in a uniform format even the security logs are recorded by security devices from different manufacturers. In the present embodiment, a web application firewall of the network detects a SQL injection attack. The web application firewall first blocks the attack and sends a syslog to an event collector of the SIEM device.

At block 902, a correlation analyzing task of the closed-loop work flow is triggered by the security events. The correlation analyzing task conducts one or more of logical correlation analysis, asset correlation analysis, and inventory correlation analysis to the received security events. By logical correlation analysis, multiple security events that correspond to the same attack may be simplified to one security event. By asset correlation analysis, security events that are targeting core assets of a network are extracted. Inventory correlation analysis may be used for further verifying if the target of an attack possesses the environment or leakage that is necessary for the attack to succeed. After these correlation analyses, a risk level may be given to each security event.

At block 903, a leakage verification task of the closed-loop work flow is triggered by the SQL injection attack because the risk level of the attack is higher than a threshold. The SIEM device schedules a web application scanner to scan the target host of the SQL attack to verify if a leakage does exist in the target host. In the present example, the web application scanner finds a SQL injection leakage does exist in a web page of the host. The scanner may also find out the common vulnerabilities and exposures (CVE) attribute, a BugTraq attribute or an S3CVE attribute of the attack.

At block 904, a risk warning is sent out to an administrator of the SIEM device based on predetermined alert policies. The risk warning may be a syslog sent to a remote terminal or an electronic mail (Email) or Short Message Service (SMS) message sent to the administrator.

At block 905, an emergency response task in the closed-loop work flow is started by the SIEM device. The emergency response may include temporarily blocking accesses to the page with the leakage, stopping web service on the host and/or block the access to the host. It will be appreciated by those skilled in the art that other emergency responses may be used for other applications.

At block 906, a leakage repairing task of the closed-loop work flow is started. The leakage repairing task may send out a work order to a software engineer indicating the leakage that needed to be repaired. The leakage repairing task may also monitor the repairing work until the repairing work is finished.

Figure 10:
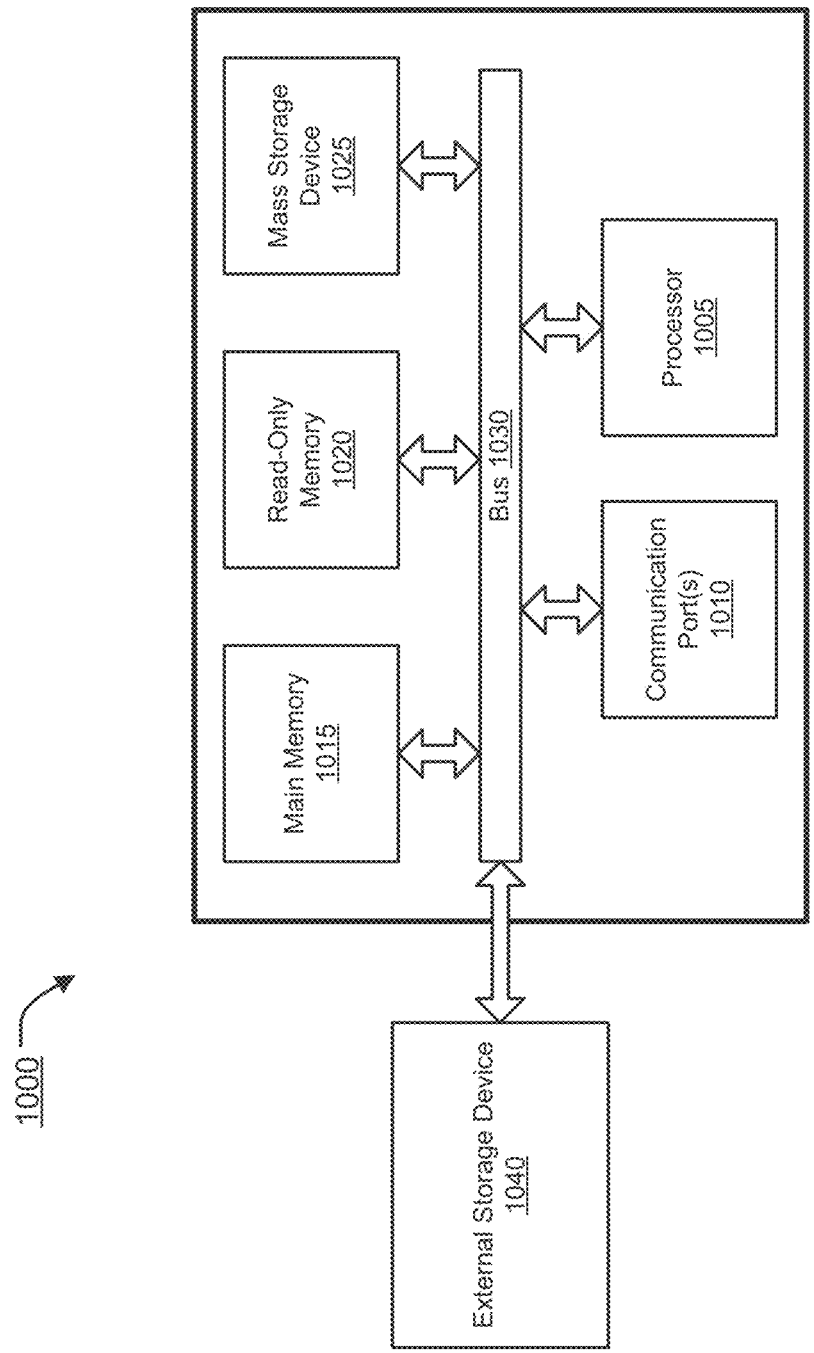
FIG. 10 is an exemplary computer system in which or with which embodiments of the present invention may be utilized.

FIG. 10 is an example of a computer system 1000 with which embodiments of the present disclosure may be utilized. Computer system 1000 may represent or form a part of a network appliance (e.g., firewall 112 or SIEM device 113), a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1000 includes a bus 1030, a processor 1005, communication port 1010, a main memory 1015, a removable storage media 1040, a read only memory 1020 and a mass storage 1025. A person skilled in the art will appreciate that computer system 1000 may include more than one processor and communication ports.

Examples of processor 1005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1005 may include various modules associated with units as described in FIG. 2.

Communication port 1010 can be any of an RS-232 port for use with a modem based dialup connection, a 10/100 Ethernet port, a Gigabit or 10 Gigabit port using copper or fiber, a serial port, a parallel port, or other existing or future ports. Communication port 1010 may be chosen depending on a network, such a Local Area Network (LAN), Wide Area Network (WAN), or any network to which computer system 1000 connects.

Memory 1015 can be Random Access Memory (RAM), or any other dynamic storage device commonly known in the art. Read only memory 1020 can be any static storage device(s) such as, but not limited to, a Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication port 1010.

Removable storage media 1040 can be any kind of external hard-drives, floppy drives, IOMEGA® ZIP Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:

receiving, by a security information and event management (SIEM) device associated with a private network, information specifying a work flow template, wherein the work flow template defines a plurality of security tasks that are to be performed by one or more security devices or replacements thereof associated with the private network and as a result of the plurality of security tasks being represented at an abstract level in a form of descriptors, the work flow template need not be changed when the one or more security devices are upgraded or replaced, wherein the plurality of security tasks include functions that are intended to protect the private network against attacks;

starting, by the SIEM, a work flow instance by:
deriving the work flow instance from the work flow template, including translating the descriptors into commands and parameters (i) for accomplishing the plurality of security tasks by the one or more security devices or replacements thereof (ii) that are specific to the one or more security devices or replacements thereof; and scheduling the one or more security devices or replacements thereof to perform the plurality of security tasks defined in the work flow template by sending the commands and parameters to the one or more security devices or replacements thereof through a device adapter layer implemented by the SIEM device; and collecting, by the SIEM device, results of the plurality of security tasks after they are performed by the one or more security devices of replacements thereof.

2. The method of claim 1, wherein the work flow template is imported from another SIEM device associated with the private network.

3. The method of claim 1, wherein the plurality of security tasks comprise one or more of antivirus scanning, web content filtering, data leak prevention, intrusion detection, intrusion prevention, vulnerability scanning, firewall filtering, application control, and network access control.

4. The method of claim 1, wherein the one or more security devices or replacements thereof comprise one or more of a unified threat management (UTM) appliance, a web application firewall, a network gateway, a firewall, an email messaging security appliance and a database security appliance.

5. The method of claim 1, wherein the plurality of security tasks are performed in serial fashion by the one or more security devices or replacements thereof.

6. The method of claim 5, further comprising determining whether a security task of the plurality of security tasks should be performed based on results of one or more previous security tasks of the plurality of security tasks.

7. The method of claim 5, further comprising transferring results of one or more previous security tasks of the plurality of security tasks to a next security task of the plurality of security tasks.

8. The method of claim 1, wherein the plurality of security tasks are performed in parallel by the one or more security devices or replacements thereof.

9. The method of claim 1, wherein the work flow template comprises a website automatic discovery work flow template and the plurality of security tasks comprise a service discovery task, a Hypertext Transfer Protocol (HTTP) service test task and a website scan task.

10. The method of claim 1, wherein the work flow template comprises a website scan work flow template and the plurality of security tasks comprise web site scanning and web application firewall blocking.

11. A security information and event management (SIEM) system associated with a private network, the SIEM system comprising:
    a non-transitory storage device having embodied therein one or more routines; and
    one or more processors coupled to the non-transitory storage device and operable to execute the one or more routines to perform a method comprising:
        receiving information specifying a work flow template, wherein the work flow template defines a plurality of security tasks that are to be performed by one or more security devices or replacements thereof associated with the private network and as a result of the plurality of security tasks being represented at an abstract level in a form of descriptors, the work flow template need not be changed when the one or more security devices are upgraded or replaced, wherein the plurality of security tasks include functions that are intended to protect the private network against attacks;
        starting a work flow instance by:
            deriving the work flow instance from the work flow template, including translating the descriptors into commands and parameters (i) for accomplishing the plurality of security tasks by the one or more security devices or replacements thereof (ii) that are specific to the one or more security devices or replacements thereof; and
            scheduling the one or more security devices or replacements thereof to perform the plurality of security tasks defined in the work flow template by sending the commands and parameters to the one or more security devices or replacements thereof through a device adapter layer implemented by the SIEM system; and
        collecting results of the plurality of security tasks after they are performed by the one or more security devices of replacements thereof.

12. The SIEM system of claim 11, wherein the work flow template is imported from another SIEM system associated with the private network.

13. The SIEM system of claim 11, wherein the plurality of security tasks comprise one or more of antivirus scanning, web content filtering, data leak prevention, intrusion detection, intrusion prevention, vulnerability scanning, firewall filtering, application control, and network access control.

14. The SIEM system of claim 11, wherein the one or more security devices or replacements thereof comprise one or more of a unified threat management (UTM) appliance, a web application firewall, a network gateway, a firewall, an email messaging security appliance and a database security appliance.

15. The SIEM system of claim 11, wherein the plurality of security tasks are performed in serial fashion by the one or more security devices or replacements thereof.

16. The SIEM system of claim 15, wherein the method further comprises determining whether a security task of the plurality of security tasks should be performed based on results of one or more previous security tasks of the plurality of security tasks.

17. The SIEM system of claim 15, wherein the method further comprises transferring results of one or more previous security tasks of the plurality of security tasks to a next security task of the plurality of security tasks.

18. The SIEM system of claim 11, wherein the plurality of security tasks are performed in parallel by the one or more security devices or replacements thereof.

19. The SIEM system of claim 11, wherein the work flow template comprises a website automatic discovery work flow template and the plurality of security tasks comprise a service discovery task, a Hypertext Transfer Protocol (HTTP) service test task and a website scan task.

20. The SIEM of claim 11, wherein the work flow template comprises a website scan work flow template and the plurality of security tasks comprise website scanning and web application firewall blocking.

* * * * *